United States Patent [19]

Figini

[11] 4,097,924
[45] Jun. 27, 1978

[54] COMPUTER OPERATOR GUIDE DEVICE

[75] Inventor: Mario Figini, Bosco Marengo (Alessandria), Italy

[73] Assignee: Ing. C. Olivetti & C., S.p.A., Ivrea (Turin), Italy

[21] Appl. No.: 720,472

[22] Filed: Sep. 3, 1976

[30] Foreign Application Priority Data

Sep. 11, 1975 Italy .................. 69260 A/75

[51] Int. Cl.² .............. G06F 15/02; G06F 3/14; G06K 15/18
[52] U.S. Cl. .................... 364/900; 364/710
[58] Field of Search ................. 364/900, 710

[56] References Cited

U.S. PATENT DOCUMENTS

| 3,855,461 | 12/1974 | Stockwell | 235/156 |
|---|---|---|---|
| 3,906,457 | 9/1975 | Mattedi et al. | 340/172.5 |
| 3,911,424 | 10/1975 | Giannuzzi | 340/324 R |
| 3,924,112 | 12/1975 | Kashio | 235/156 |
| 3,925,775 | 12/1975 | Gay | 340/324 R |
| 3,925,777 | 12/1975 | Clark | 340/336 |
| 3,976,975 | 8/1976 | Cochran | 340/172.5 |
| 3,978,453 | 7/1976 | Check, Jr. et al. | 340/172.5 |
| 3,979,058 | 9/1976 | Katz et al. | 235/156 |
| 4,009,379 | 2/1977 | Lausch | 235/156 |

*Primary Examiner*—Gareth D. Shaw
*Assistant Examiner*—C. T. Bartz
*Attorney, Agent, or Firm*—Schuyler, Birch, Swindler, McKie & Beckett

[57] ABSTRACT

In a computer having a keyboard for entry of data represented by a series of bytes and/or instructions, processor is provided for processing data entered via the keyboard with a control unit controlling the entry and processing of data. An activatable guiding device including a single digit display instructs the operator by displaying as a number of machine conditions to the operator, a number of signals corresponding to a plurality of configurations of a single byte output from the processor. The control unit generates an activating instruction for activating the display.

3 Claims, 9 Drawing Figures

COMPUTER OPERATOR GUIDE DEVICE

BACKGROUND OF THE INVENTION

This invention relates to an operator guide device for computers, accounting machines and similar programmable machines, comprising a keyboard for the entry of data and/or instructions, a unit for the processing of data entered via keyboard, said data being represented by a series of bytes and a programming unit for controlling said entry and said processing, said device comprising a display panel controlled by a processing unit whereby the various conditions of the machine are conveyed to the operator.

In this class of machine, ease of use and the facility of the device to solve particular problems are emphasized. Being easy to use, they have the advantage of low running cost as highly paid technicians are not required.

The facility of the device to solve specific problems enhances the value of the system as the user can exploit that calculating power which is strictly necessary to solve his particular problem locally and promptly, independent of the procedures that condition using large time-sharing computers.

Standard application programs are normally designed and supplied to the user for this family of machines. These are therefor tailored to solve specific problems, thus simplifying use and increasing the throughput rate.

It is clear that, if the decisions the operator must make and apply to the machine are minimal or nonexistent, his knowledge of calculating procedures performed by the machine may not even be required but the programs must be increasingly more complete and difficult to change.

When, on the other hand, computation requirements involve an analysis of intermediate results and consequently a user's decision to alter or terminate subsequent processing, the program can no longer make the necessary choices to solve a complex user problem. In such cases, the user must be able to control processing development procedure so that he may intervene in machine activity at given times.

Operator guide display panels have been created for these machines for this purpose, with NIXIE tubes or with LED semiconductor components or with liquid crystals, as a result of predefined processing results, in a standard language, comprehensible to all users, to supply the warnings, the requests and the indications of current processing.

These display units and the relative control logic are however very complicated and costly and are not worth using on economically programmed machines, which would in any case fall within the lowest application range, where, as already mentioned, operation intervention is minimal.

SUMMARY OF THE INVENTION

The invention should thus solve the technical problem of providing a very economical display that can be controlled by a simple logic unit, without restricting the flexibility of the indications to be provided during the various operations that have been carried out.

This problem may be solved by the computer according to the invention, which is characterized by the fact that said display is capable of indicating a series of symbols corresponding to the different configurations of a single byte output by said central unit in conjunction with an activating instruction of said display.

BRIEF DESCRIPTION OF THE DRAWINGS

A complete understanding of these and other characteristics of the invention may be had by reference to the following description given in the forms of an example and in conjunction with the accompanying drawings, wherein.

DETAILED DESCRIPTION OF THE PREFERRED EMBODIMENTS

Figure 1:
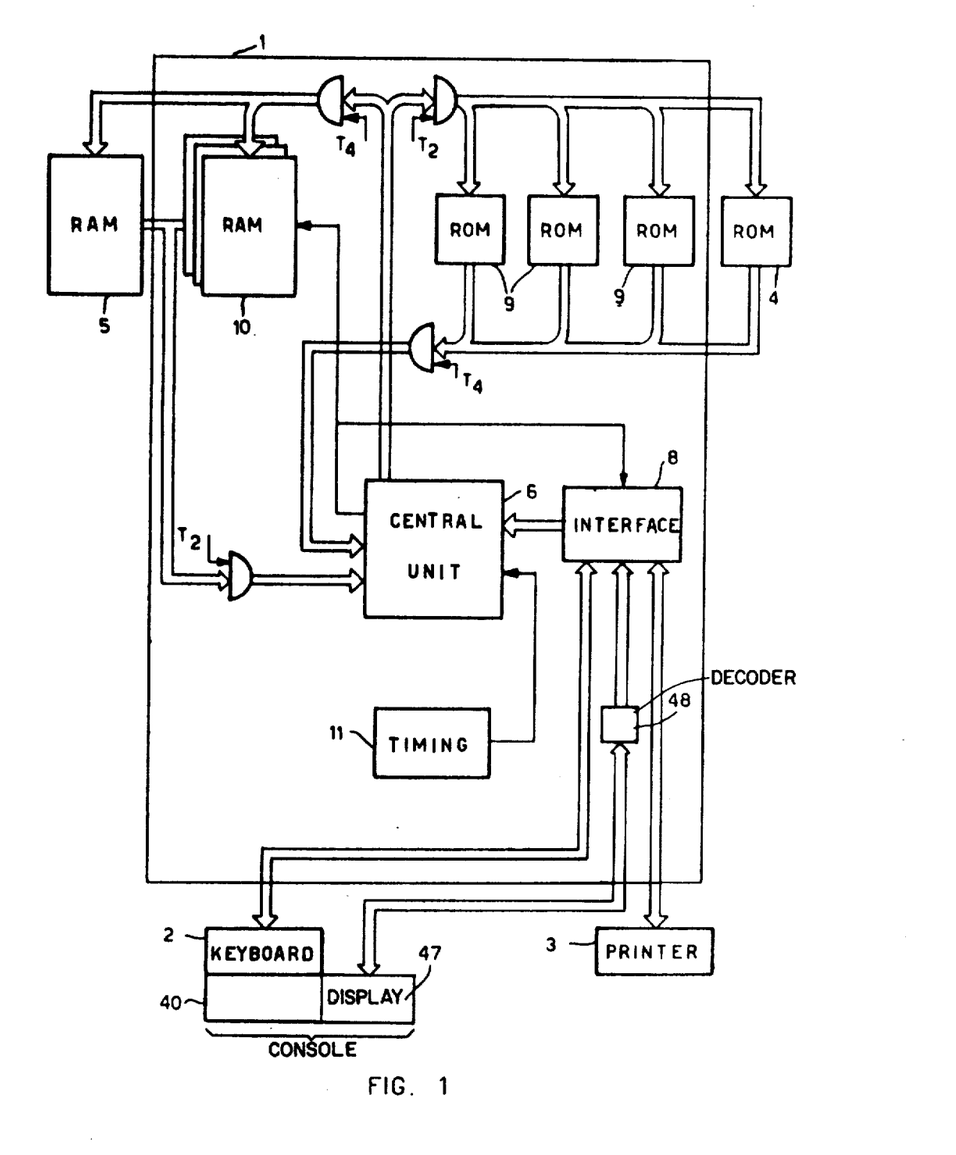
FIG. 1 is a block diagram of a computer housing an operator guide device according to the invention.

With reference to FIG. 1, 1 indicates the basic processing unit of the computer. The computer includes a keyboard 2 for the entry of data and instructions, a printer 3 for the output of data and symbols of instructions, a read-only-memory (ROM) 4 for micro-programs and a read/write memory (ROM) 5 for data constants or intermediate results. Both memories 4 and 5 are removable and connectable to basic unit 1 by the operator.

Basic unit 1 includes a central unit 6 capable of processing data entered via keyboard 2 and one or more ROMS 9 (three ROMs 9 in FIG. 1) each of which may contain 1024 microinstructions, which are executable when the operating keys of keyboard 2 are depressed.

Basic unit 1 also includes a RAM memory 10 made up of 16 modules, each designed to write and read 256 byte locations, a timing circuit 11 and an input/output interface 8 that receives signals coming from keyboard 2 and printer 3 and adapts them to the wave frequency and amplitude requirements of the processing circuits.

The central unit 6 (FIG. 2) comprises an input/output register 20 for the exchange of 4-bit data between the central unit and memories 4, 5, 9 and 10. Register 20 is connected to a 4-bit accumulator 21, which in conjunction with a 4-bit adder 22, forms the arithmetic unit of the computer. The RAM address register 27 is connected to accumulator 21, and the ROM and RAM address output register 28 is connected to the register 27 and to a ROM address register 26. The three registers 26, 27 and 28 consist of 12 bits.

Figure 2:
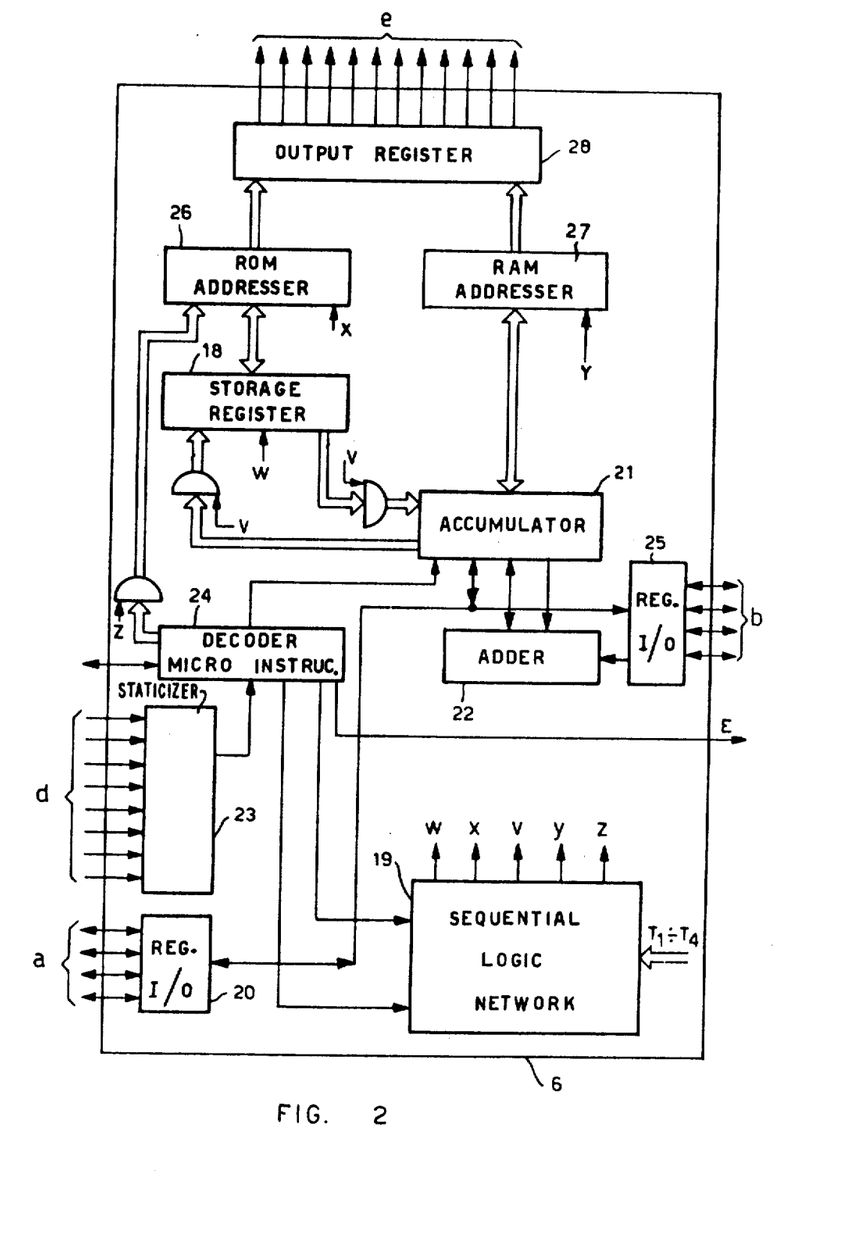
FIG. 2 is a diagram of the central unit of the computer.

Apart from the above, the central unit 6 comprises a storage register 18 for ROM addresses to be used to store a ROM address temporarily during program jumps. Central unit 6 is capable of exchanging 4-bit data in both senses via register 25 and interface 8 (FIG. 1). Lastly, central unit 6 is capable of selectively receiving an 8-bit microinstruction from ROMs 9, via staticizer 23, which controls the operation.

Besides the function code, each microinstruction also contains the RAM 10 register address containing the data to be processed. Lastly, central unit 6 comprises a sequential logic network 19 connected to decoder 24, which decodes microinstructions staticized in the staticizer 23, to generate a series of enabling commands and signals Y-Z for a plurality of central unit operations.

A plurality of microprograms are recorded in the ROMs 9, each of which may contain a variable number of microinstructions. Each microprogram is selected by addressing the first microinstructions of the microprogram itself. Subsequent microinstructions of the same program are addressed, in the known manner, either by incrementing the address or by branching.

A jump is obligatory whenever a jump is made from one ROM 9 to another ROM 9 or one page to another in the same ROM 9.

ROM 9 and RAM 10 are addressed via the same register 28 but at different periods of a cycle run as described in U.S. patent application Ser. No. 647,000 filed on Jan. 7, 1975.

Each module of RAM 10 is organized in 16 registers R1-R16 (FIG. 3) each containing 64 bits. The same number of numeric data can be shown in floating point format in register R1-R8. Registers R9 and R10 are used as keyboard buffers to house 8-bit codes corresponding to operator-controlled numeric keys and function keys to be found on keyboard 2.

Figure 3:
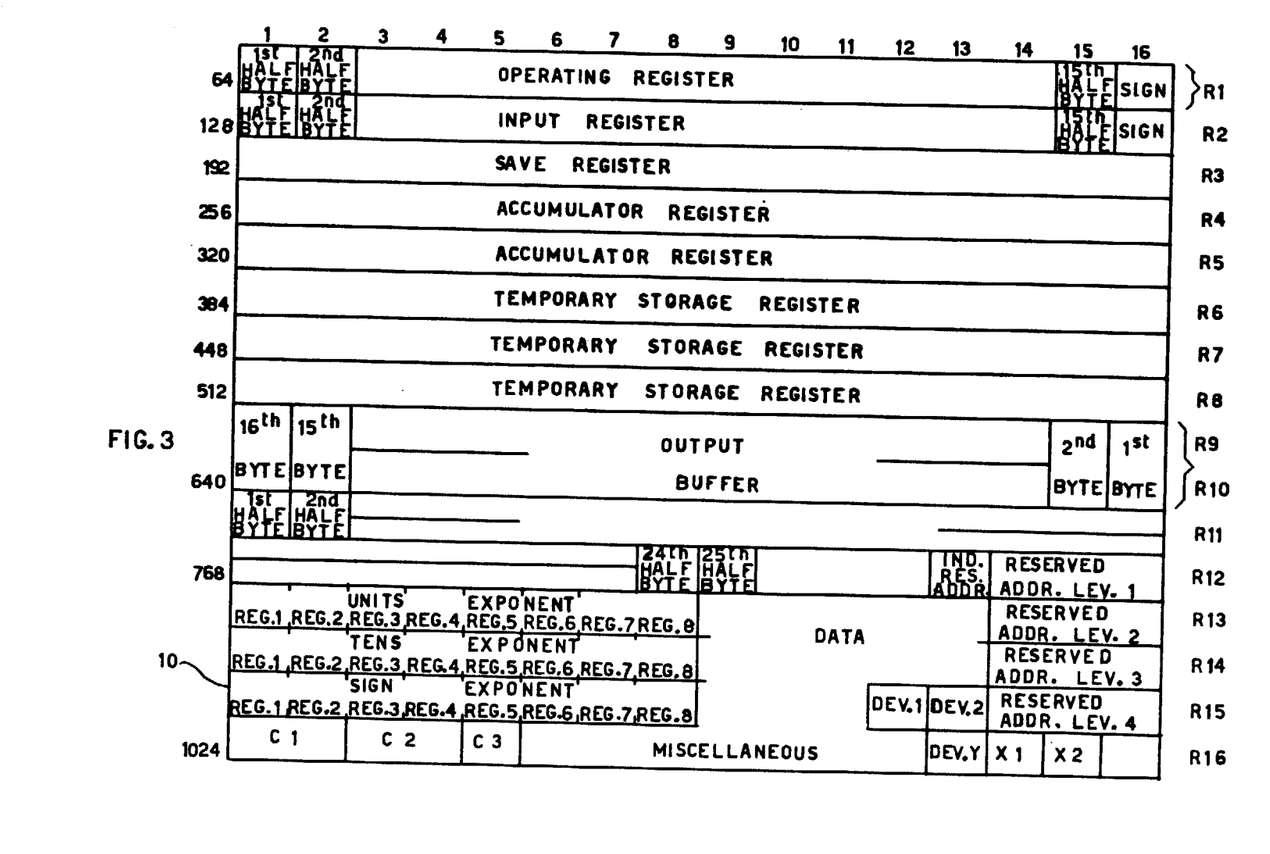
FIG. 3 is a schematic diagram of the operating memory of the computer.

The register R11 and 9 semi-bytes of register R12 are used as an output buffer to store the data cycle codes to be output to printer 3. The remaining memory locations are used for miscellaneous information (program switching means, counters, etc.) as will be further explained hereinafter.

Each computer operation is carried out by central unit 6 through executing one or more microinstructions in the known manner as described in the previously referenced patent application.

For this purpose, keyboard 2 includes a numeric section 30 (FIG. 4) comprising a series of keys to enter the figures zero through nine with an algebraic sign, in keyboard buffers R9, R10 (FIG. 3). Section 30 includes a key KB-CL 29, used to delete the last datum entered but not yet used by the machine. Keyboard 2 also includes an operating section 31 comprising a series of function keys for commanding the relative functions. These keys also enter the relative codes in keyboard buffers R9 and R10.

The machine is able to operate in the manual and in the programming mode. ROM 4 (FIG. 1) is not used in the manual mode and may be removed from the machine. The user on the contrary resorts to operating section 31 of keyboard 2.

A test is performed in the known manner, in buffers R9, R10, on the code entered to recognize operation codes, whenever numeric keys or operating keys are depressed.

When any one of these codes are recognized, it is transferred to the register 26 of central unit (FIG. 2) and addresses a corresponding microprogram contained in ROM 9.

This microprogrm, according to the different machine modes and the key-commanded function controls the relative operational sequence.

To be more precise, an addition key 32 commands the sum of the last datum entered and printed with the R4 accumulator register of RAM 10 (FIG. 3). A subtraction key 33 is used to subtract the last number entered from register R4. A multiplication key 34 and a division key 35 are used to respectively preset the multiplication and division operation between the first number in register R2 and the second number in register R3.

Figure 4:
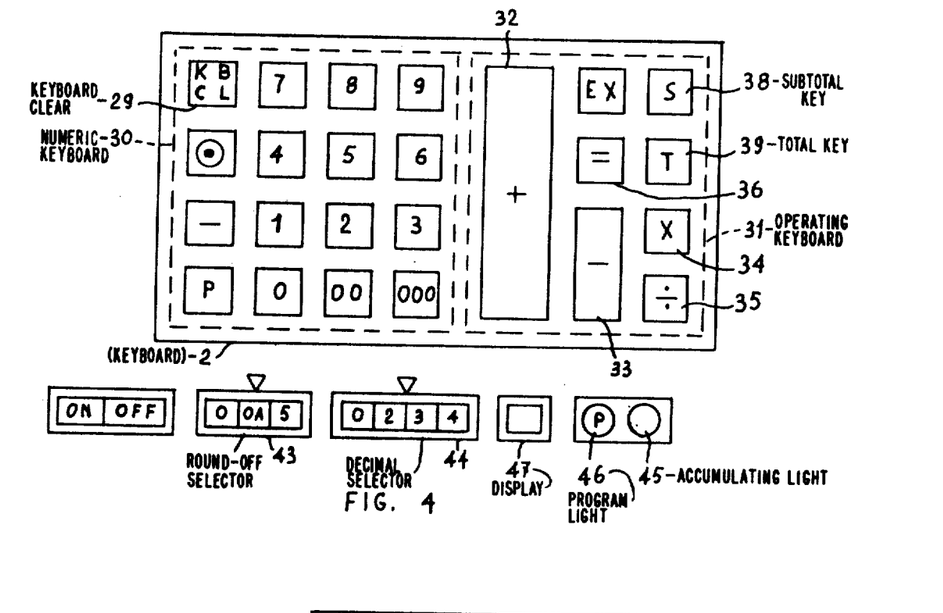
FIG. 4 is a diagram of the computer keyboard.

An equals key 36 causes the operation to be executed on the last datum entered and prints the result of the multiplication or division previously entered. A subtotal key 38 is used to print the contents of accumulator register R4, followed by transfer of the contents to R2, without clearing register R4. A full total key 39 is used to print and clear accumulator register R4 contents, followed by transfer of the contents to R2.

When operated in the programming mode, an external ROM 4 has to be inserted. Each ROM 4 has a 2048-byte capacity, therefore it may be considered as having two modules organized in 16 pages of 64 bytes each. Since each byte contains a microinstruction, a page may contain 64 microinstructions. ROM 4 is also addressed by the ROM 26 addresser.

The majority of microprograms of external ROM 4 constitute variations of similar microprograms of internal ROMs 9 which are provided for particular user requirements. Consequently, they are tailored for special applications (statistical tabulation, invoices, payslips, etc.).

The user therefore utilizes ROM 4 when not only elementary mathematical operations are required (the relevant programs are contained in ROMs 9) but also for an appropriate sequence which has been established to solve a specific problem and for a close correlation between computing and printing.

Furthermore, microprograms are provided in the external ROM 4, which execute functions other than computation, for instance, printing a constant value contained in a register, feeding a print document, displacing a movable print means and so on. The first 128 positions of ROM 4, which constitute the first two page of the document, contain 64 jump microinstructions and are in one-to-one correspondence with the numeric codes of the microprograms to be entered via keyboard for microprogram selection.

Each of these 64 microinstructions addresses the location of the first microinstruction of the corresponding microprogram, in this manner passing control of basic unit 1 to it.

Figure 5:
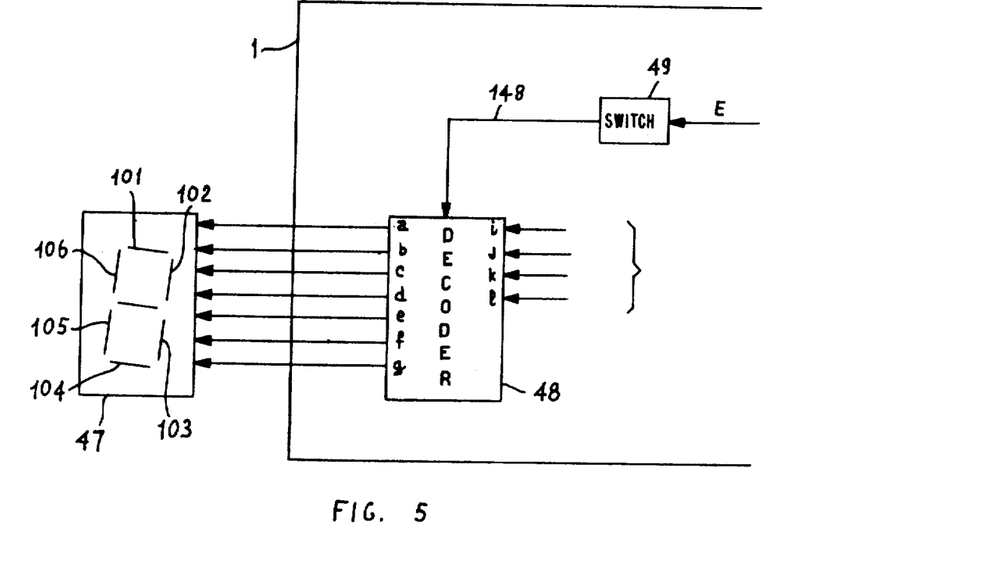
FIG. 5 is a schematic diagram of a detail of the operator guide device.

The section 30 of the keyboard 2 comprises a program key P. This key is depressed to cause the machine to change from the manual to the program mode. In other words, the machine is preset to execute the microinstructions composing the microprograms of the external ROM 4 (FIG. 5) inserted in the user's machine to carry out special computation. If, following the entry of a number in keyboard buffer R9, R10 via the numeric keys, key P is depressed, the microprogram analyzing keyboard buffer R9, R10 causes a microprogram corresponding to the number entered to be addressed to ROM 4, which takes over control of the machine in this way. The microprogram analyzing keyboard buffer R9, R10 thus identifies key code P, during the recognition process of characters entered via keyboard and gives over control of central unit 6 to the microprogram of external ROM 4 corresponding to the numeric code entered previously via key P.

The machine is also provided with a console generally indicated as 40 including a rounding-off selector 43, capable of adding an appropriate number, to the lowest order of the decimal digits to be truncated, for the results of a previous operation. The number of decimal numbers required for this result and consequently for the truncation of the exceeding numbers are on the other hand, preset via a second selector 44. The latter is also capable of assuming an additional location in which the machine may be preset in the ADD-MODE as described in the U.S. application Ser. No. 715,126 filed on Aug. 17, 1976.

OPERATOR GUIDE DEVICE

Console 40 includes a light indicator 45, which comes on in the known manner whenever decimal selector 44 is in the accumulator position. A second light indicator 46 is capable of being illuminated when the machine is in the program mode, that is when key P is depressed and stays on throughout program execution.

The console also includes a display 47 designed to indicate a series of machine conditions to the operator.

Display 47 of the single-character LED type comprises 7 segments which can be selectively energized to indicate a series of alphanumeric characters or other symbols. Display 47 is connected to basic unit 1 (FIG. 1) via a series of seven conductors a, b... g (FIG. 5) one for each semi-conductor segment. Further, the seven conductors a-g are connected to display 47 via hexadecimal decoder 48 contained in a basic unit 1. The latter is enabled by a signal on line 148 which in turn is connected via 4 conductors i, j, k and l to the interface 8 (FIG. 1), therefore a 4-bit byte output by central unit 6 may be decoded by decoder 48 to command the display of 16 different symbols. The single-character display 47 with its seven segments is able to configure the following alphanumeric characters: 0, 1, 2, 3, 4, 5, 6, 7, 8, 9, A, b, c, d, E, F, h, H, I, L, P, U, apart from symbols. The machine conditions to be displayed in each application are however fewer than the number of characters which can be displayed, therefore only a part of them can be selected for each single application. A corresponding group of said characters indicating the events belonging to a particular application is used. These groups correspond to a different externally inserted ROM 4.

Decoder 48 is removably insertable into the machine, therefore a decoder 48 corresponding to the ROM 4, which had been inserted for this purpose, is inserted each time. The corresponding group of characters are selected in this way through the 16 byte configurations received by interface 8. Alternatively the same character or group of characters, used in different applications, may indicate different events. The relationship between the character and the event is noted each time in descriptive tables each of which is attached to the external ROM 4, or on a paper tab visibly located on the same ROM 4.

As will be seen hereinafter, the symbols in the display are allotted to various program situations that is, certain symbols are displayed in correspondence to program stops to advise the operator that the machine is available for the following maneuver called by the program.

Apart from these indications, the display may give other information generally used to advise the user as to error condition anomalies in computation procedures. The characteristic common to these indications is that the relative symbol flashes intermittently on display 47. An already known switching device 49, is supplied for this purpose, connected via line 148 to decoder 48 and controlled by the central unit 6. Device 49 is activated by an error signal to periodically de-energize decoder 48, thus display 47 flashes the relative symbol intermittently as will be further described hereinafter.

LIST OF MICROINSTRUCTIONS

The computer performances described herein may be carried out using the following instructions:

EX — causes an exchange between the four bits of accumulator 21 and the cell of the currently addressed RAM 10;

LD — causes the loading of RAM 10 address register 27;

LDI — causes the four bits provided by the same instruction to be transferred to accumulator 21;

DOA — causes the current datum on accumulator 21 to be transferred to accumulator 21 on the output;

LBL — occupies two ROM 9 locations, consequently two storage cycles are required to call and carry out this microinstruction during the first cycle, the first eight bits constitute a unique operating code which effects the transfer of the second eight bits to the RAM 10 register 27.

DISPLAY CONTROL

Display 47 may be directly controlled by program. In this case, only two microinstructions are basically involved in carrying out the display 47 control.

An LDI microinstruction having an operating code of only 4 bits, contains, in the address field itself, the 0 - 15 code byte of the symbol to be displayed after it has been correctly decoded by decoder 48.

Figure 6:
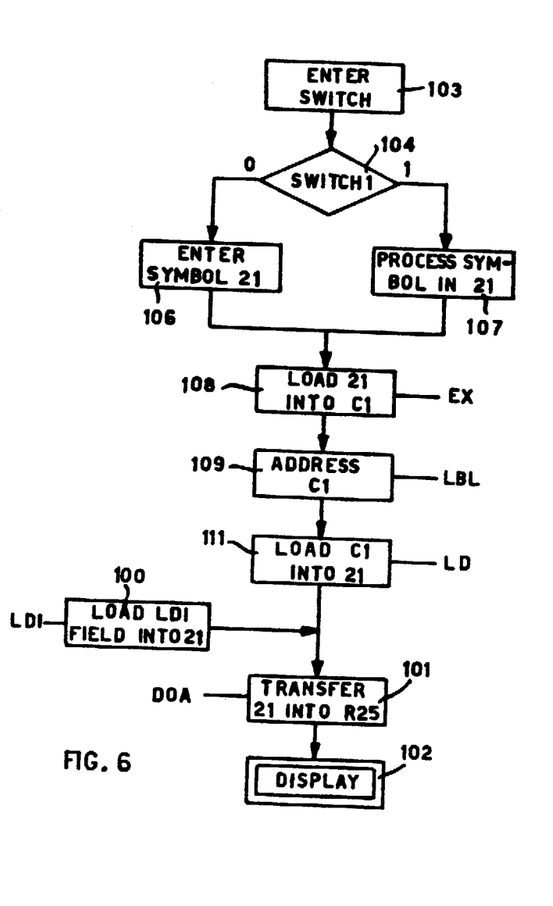
FIGS. 6 and 7 show two flow charts of computer routines.

Consequently, it controls an operation 100 (FIG. 6) which causes the code byte of the symbol to be displayed, to be loaded in accumulator 21 (FIG. 2). A DOA microinstruction comprising eight bits follows the LDI microinstruction. Operation 101 causes the symbol code to be displayed in accumulator 21 to be transferred to register 25 and then, through register 8, to decoder 48 and then to display 47 (operation 102).

There is another possibility of controlling display 47, often used in cases where applications involve cyclic warnings, that is to transfer the symbol code to be displayed, to accumulator 21 always from the same cell C1 of RAM 10.

Therefore, the symbol code to be displayed is always to be found at a fixed address where it may be called for display. The symbol code to be displayed may be located in the fixed address cell C1. This location may be effected either manually or via program. A switch DEV 1 of RAM 10 is set at 1 for this purpose when the machine is in manual mode and at 1 when it is in the program mode (operation 103 in FIG. 6). If test operation 104 finds switch DEV 1 = 0, it causes load operation 106 of accumulator 21 with the symbol code entered manually via keyboard 2. If, one the other hand, DEV 1 = 1 is found, test 104 causes a processing operation 107 in accumulator 21, to generate the code to be displayed as an ordered sequence controlled by the results of the processing that follow. In the former and latter instances, an operation 108 is then effected, commanded by a microinstructions EX updating cell C1 contents. In other words, microinstruction EX carries out an exchange between the memory thus addressed and accumulator 21.

When the program subsequently fetches a microinstruction LBL, cell C1 is addressed with an operation 109, followed by the execution of a microinstruction LD (operation 111) which commands the loading of accumulator 21 with the contents of cell C1. Following thereafter, a microinstruction DOA commands the output of the datum in the accumulator towards interface 8 as in the preceding case.

Figure 7:
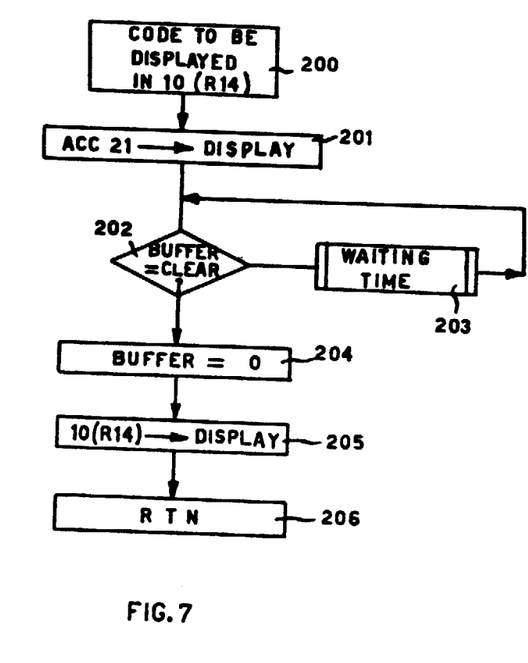

The intermittent flashing indications which display 47 may send, when encountering anomalies or errors during processing, are generated under the control of a microprogram as represented in the flow chart shown in FIG. 7.

The first operation of the error routine indicated as 200 in FIG. 7 is the storing of the code currently displayed in cell 10 of register R4 of RAM 10 (FIG. 13) so as to recover it once the error has been corrected. This is so because if the current processing indicated by the symbol displayed on display 47 has generated an error, it must be repeated. The symbol displayed intermittently on display 47 thus advises the operator that the incorrect processing should be repeated. Following operation 200 (FIG. 7), the transfer of the error code is executed from accumulator 21 (FIG. 2) where it was loaded by microinstruction LDI (as has already been explained) to interface 8 and subsequently to display 47 (operation 201).

At this stage, a test 202 is performed to verify that keyboard buffer R9–R10 of RAM 10 (FIG. 3) contains the code of key KB-CL 29 (FIG. 4) activated to delete the incorrect entry. If this code is not present, a routine is carried out that includes the counting operation 203 for amounts exceeding 1 in accumulator 21 until overflow is reached and a test is performed on overflow at each summation. When the latter occurs, an error signal is generated to enable device 49. This occurrence at a particular moment of the timing cycle causes decoder 48 to be disabled and display 47 to go off.

In other words, following counting operation 203, the generation of an error signal always occurs through a microinstruction EOR which carries out an exclusive OR operation between the current signal and the input of device 49 and 1. As already known, the result will always be the opposite of the initial input state. In this manner, with display 47 off, test 202 is repeated and the counting operation 203, following which a new switch, as obtained in the known manner, causes display 47 to be enabled again, consequently the intermittence frequenty is defined by the counter cycle of accumulator 21.

In the case where test 202 is correct, keyboard buffer R9–R10 is cleared via the depression of key KB-CL 29 (operation 204) and the symbol code which was to be found previously on display 47 is transferred again from cell 10 of register R14 of RAM 10, through accumulator 21 (operator 205).

Lastly, the microprogram restarts processing via a RTN jump (operation 206).

EXECUTION OF EMPLOYEES WAGES COMPUTATION

The following description is given as an example of the application of operator guide performance as previously illustrated, as applied to a complex but practical problem of repetitive computation as might be that of computing employee wages.

Figure 8:
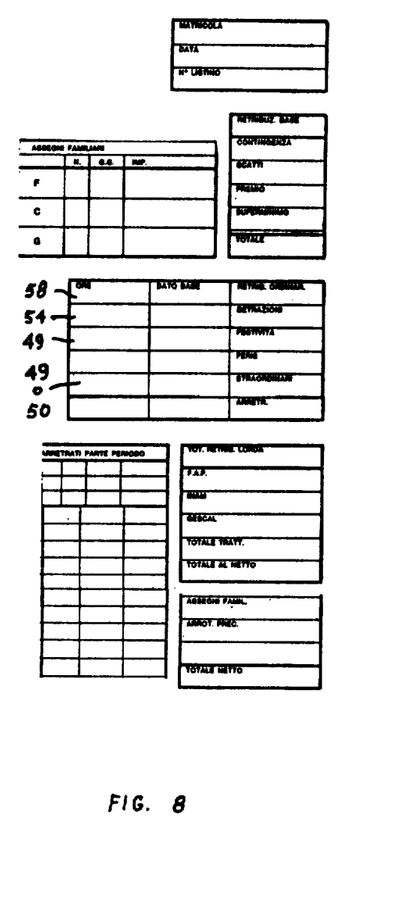
FIG. 8 gives an example of a form used for an accounting operation in which the device according to the invention is involved.

FIG. 8 illustrates the document for which data constituting those elements which are generally used for computing employee wages.

The layout of the document is organized in lines, and some lines are divided into columns.

Lines and columns thus define those spaces where data relative to the wages of each employee should be printed. The significance of each datum is defined by headings in the spaces and the data is processed by the central unit (FIG. 6) via the execution of a corresponding ROM 4 program. The program is divided into subroutines, each corresponding to a defined computing sequence. The user may select each of the subroutines by depressing the corresponding numeric codes in keyboard section 30.

For this purpose, a numeric code corresponding to a numeric code for calling the wage is used to process the relative datum. For example, code 58 selects the subroutine used to compute "Deductions", code 49 selects the subroutine computing the amount to be added for "Days off" on the basic normal wage consequently in the document illustrated in FIG. 8 the relative lines are defined by code numbers of the corresponding subroutines. Certain spaces on the document appeared in the document in FIG. 8 correspond to a group of codes and not to a single code of the subroutine (having a plurality of variants), the purpose being to consent the maximum applicational, flexibility of the machine for the user.

In fact, if the computation of a particular subroutine has to be based on constant values which vary according to a particular time or a particular subject, the operator has the possibility of selecting that particular subroutine to meet his requirements via one of a plurality of codes but at the same time still printing the result in the same space provided for such computation. For example, if the item "overtime" is to be computed on the basis of 125% of the basic amount of hourly wage, the code of subroutine 49 corresponds to it; if, on the other hand it must be computed on the basis of 130%, the corresponding code will be 50 and so on.

In order to enable the machine to carry out a wage program, a RAM 5 has to be inserted to expand storage in such a way as to contain: the data pertaining to the wage to be computed, the results obtained and to be printed, a prerecorded ROM 4 with the necessary program instructions and the constants involved in social security and tax deductions all of which allow automatic execution of the operational sequences.

The operator must perform two preliminary functions:

Assign a check digit to the employee's code reference number via the machine.

Assign a code, based on the family situation and income, for the automatic computation of family allowance, tax deductions and contributions.

The machine is normally in the manual mode and displays the character "0". In the first place, certain initialization procedures must be carried out. After having depressed key P, the machine goes to the program mode and displays the character "I". After a datum has been entered during the operations that follows, the + key 32 must always be pressed in order to execute the relative routine. In order not to complicate the matter, activation of the + key 32 will not be mentioned again.

The operator then enters the program code. After printing, the machine displays the letter "c". The operator now enters a numerator with the ordinal number of the wage being computed and the machine displays the letter "b". This symbol is a request for the operator to enter, in code, the basis of the remuneration (weekly, monthly, yearly, etc.). The machine now displays the character "d" asking for the data to be entered. The machine initialization phase then terminates (block 300 in FIG. 9).

Figure 9:
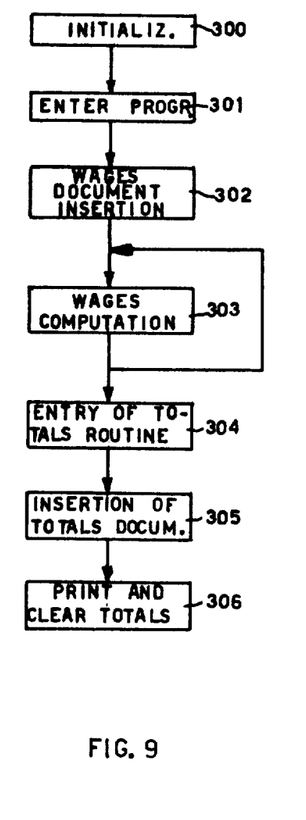
FIG. 9 is a flow-chart of a program for the accounting operation as illustrated in FIG. 8.

The program is now entered (block 301), by entering the function codes in the same sequence as applied to the program. Each code comprises two numeric characters that call the corresponding sub-routine. After each code the character "I" is displayed. The end of program code comes last and causes the character "c" to be displayed. Subsequently, if the document has not yet been inserted in printer 3 of the machine, the character "F" is displayed. After having inserted the document which is generally a continuous form, the machine again displays the character "0" (block 302). The wage can now be computed entering the data in the sequence as indicated in the document described in FIG. 8 (block 303). The character "1" is displayed when only the entry of one numeric datum is anticipated, the character "2" when the entry of two numeric data is anticipated. The employee's code and reference number must be entered with the check digit.

If the operator desires to jump a box in the payslip, the + key 32 must be pressed without a previous numeric entry. The computation of block 303 is repeated for each employee. The totals must be printed and cleared at the end of the day. For this purpose, the print and clear routine (block 304), is called via numeric keyboard. Subsequently, the document for printing totals is inserted into the printer. Subsequently, the machine again displays the character "I" (block 305).

The printing and clearing of the totals (block 306) may now be executed by pressing the + key 32.

The following table summarizes the significance of the indications given by display 47 with the corresponding user intervention desired.

| Character displayed | Indication for user | User intervention |
|---|---|---|
| 0 | The machine operates in manual mode | Depress key P |
| I | Request for codes to define the program | Enter the codes in groups of 9, each followed by the + key |
| c | Request for entry of adder-wage (number of times the program has been executed) | Enter the ordinal number of the wage which has been reached |
| b | Request for entry of attendance | Enter 12 for monthly attendance, 52 for weekly attendance |
| d | Request for entry of date | Enter date |
| F | Request for insertion of continuous form in the printer | Insert continuous form and press key P |
| 1 or 2 | Request for a datum involving wage or two data in adjacent boxes of the payroll | Enter the data followed each time by the + key |
| I | The machine, subsequent to a wage computation, awaits user instructions. | Recall the program for the following wage again or recall the print and clear program |

As may be seen above, the indications anticipated in these cases involving a particular data field in accounting operations through the use of the document as shown in FIG. 8, do not vary since the relative processing significance does not vary. Consequently, the indications the machine imparts to the user is common to a family of subroutines and relative to a particular data field on a document.

During the operations performed for each subroutine, whatever particular processing may be carried out, variable data must be entered via keyboard 2. The current subroutine stops at a particular instruction "Enter data via keyboard" waiting for the user to enter the operands of current processing (hours worked, hours off, annual leave, overtime, public holidays, etc.).

The number of figures the user enters must not exceed the number provided by the instruction.

Whenever this number overflows, the current symbol appearing on display 47 flashes to indicate an error condition. At this point, the user depresses key KB-CL 29 which causes the error signal to go off and the previous signal to be recovered.

For instance, if after entering program generation codes, as described before, the machine stops awaiting the datum "reference number" and the operator enters more than 15 figures (that is causing an overflow in keyboard buffer R9–R10) of RAM 10, the character appearing on display 47, starts flashing to indicate an anomaly.

Consequently, it is clear that a certain number of symbols appear on display 47 in correspondence to special program stop instructions to advise the operator that the machine is available for the subsequent maneuver required by the program.

The following characters flash intermittently on the display as a result of errors made during the application of wage computation.

I — When operator input causes keyboard buffer R9–R10 to overflow, or when the employee's code or the check digit has been entered incorrectly.

E — When the operator enters a datum for the field in which it must be printed, or when the total of the RAM 10 wage document in the accumulator register overflows.

2 — When the operator-controlled entry overflows keyboard buffer R9–R10 the function following the last called by buffer anticipates a two-data entry.

It is clear that although the two latter indications when used in such a way as to characterize anomalies or computation errors, the same under different processing conditions, might assume different meanings as an alternative when fixed characters are indicated. Consequently, the number of the executable indications which display 47 can show is practically double the possible configurations of its seven segments.

Obviously numerous modifications and variations may be made to the structure of the present invention without departing from the embodiment of the invention.

What is claimed is:

1. In a computer, accounting or similar programmable machine having a keyboard for entering information represented by a series of multibit words and a stored program processing unit for processing said information, an operator guide device comprising a display device controlled by said processing unit for displaying to the operator a number of machine status warnings, said display device including a single character display cell adapted to display one character at a time of a group of characters which can be defined by one word of information, said characters being formed of a plurality of signs individually actuatable by a corresponding signal, and a decoder for selectively actuating a combination of said signs in response to a word received by said processing unit by generating a corresponding combination of signals, whereby a plurality of symbols can be displayed corresponding to a plurality of configurations of a single word output by said processing unit.

2. An operator guide device according to claim 1, wherein the decoder is manually removable, whereby the user can vary the symbols corresponding to the various word configurations.

3. An operator guide device according to claim 2, further comprising error detecting means actuable by said processing unit in response to the occurrence of machine errors, and display flash means actuatable by said detecting means for conditioning the display to flash corresponding symbols, said flash means comprising a circuit controlled by a counter in said processing unit for temporarily disabling said decoder each time said counter overflows.

* * * * *